July 1, 1924.
C. G. TURNER
OVEN OR DISPLAY DEVICE
Filed Aug. 13, 1920
1,499,957
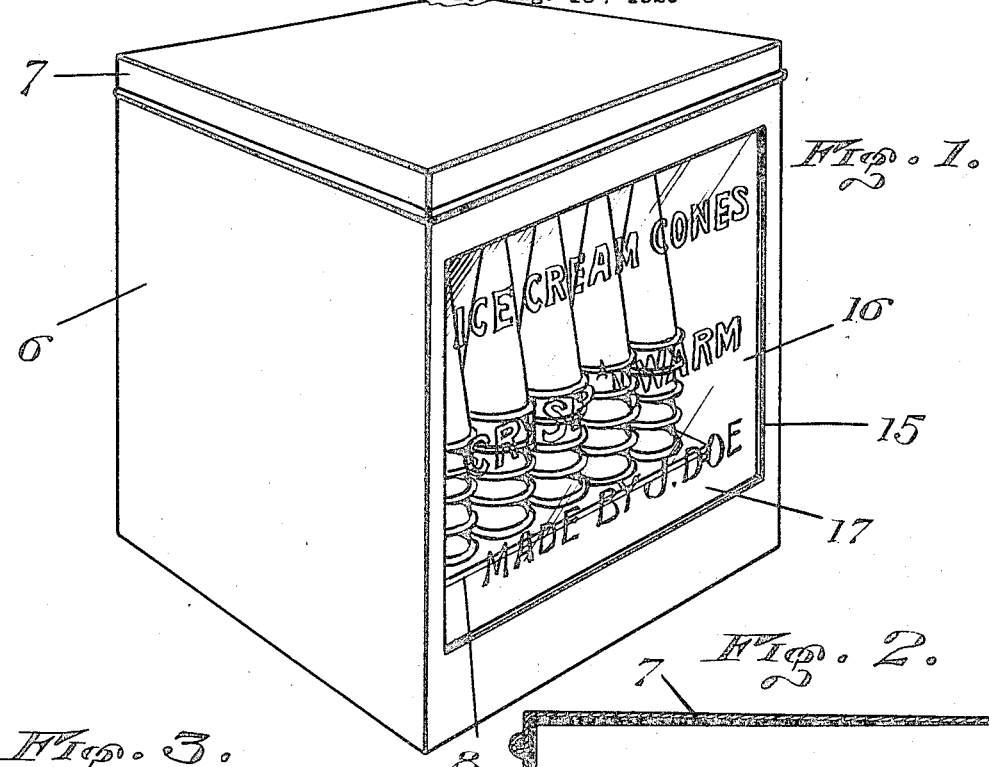
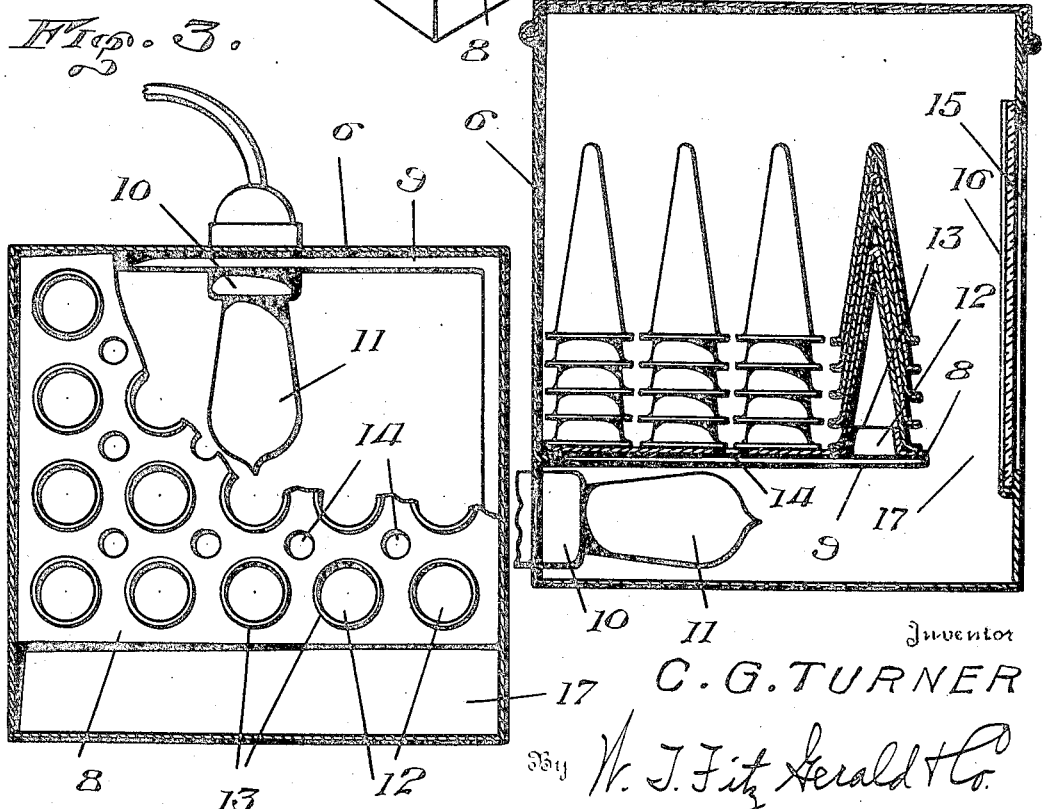
Inventor
C. G. TURNER
By W. J. Fitz Gerald & Co.
Attorney Patented July 1, 1924.

1,499,957

UNITED STATES PATENT OFFICE.

CHARLES GAINER TURNER, OF ATLANTA, GEORGIA.

OVEN OR DISPLAY DEVICE.

Application filed August 18, 1920. Serial No. 404,345.

*To all whom it may concern:*

Be it known that I, CHARLES GAINER TURNER, a citizen of the United States, residing at Atlanta, in the county of Fulton and State of Georgia, have invented certain new and useful Improvements in Oven or Display Devices; and I do hereby declare the following to be a full, clear, and exact description of the invention, such as will enable others skilled in the art to which it appertains to make and use the same.

The present invention relates to a device combining an oven and display panel, adapted especially for heating or warming ice cream cones or other articles by means of an electric lamp or bulb, and also providing for display and advertising, thereby promoting the sale of the cones or articles, and rendering them more palatable, by heating or warming them so as to render same more crisp and fresh.

Ice cream cones and similar baked articles left standing for several days, or a period of time, especially during damp weather, will absorb moisture and become tough and soggy, thereby depreciating considerably from their crispness and taste, and detracting from the saleability thereof, and it is an object of the present invention to provide an oven for heating the cones or articles and keeping them warm for use, whereby to restore their crispness and freshness, and, at the same time, to afford display or advertising medium to enhance the sales made, using an electric lamp as a source of heat and light for the two purposes.

Another object is the provision of a simple and inexpensive oven containing the electric lamp or heating and lighting unit and having means for supporting the cones or articles, and a display panel, with the parts in a novel arrangement to accomplish the results in an advantageous and efficient manner.

With the foregoing and other objects in view, which will be apparent as the description proceeds, the invention resides in the construction and arrangement of parts hereinafter described and claimed, it being understood that changes can be made within the scope of what is claimed, without departing from the spirit of the invention.

The invention is illustrated in the accompanying drawing, wherein:—

Figure 1 is a perspective view of the improved oven and display device.

Fig. 2 is a vertical section thereof.

Fig. 3 is a horizontal section above the shelf or false bottom, showing a portion thereof broken away.

In carrying out the invention, there is provided an oven casing 6 of sheet metal, porcelain or other suitable material, having a hinged top 7, which can be swung open for access into the casing, and such casing can be of any suitable size and shape. A false bottom or shelf 8 is supported within the casing above the bottom thereof, by means of flanges 9 on the walls of the casing, or in any other suitable manner. One wall of the casing, preferably the rear wall thereof, carries an electric lamp socket 10 into which the plug of an electric lamp or bulb 11 is screwed, to extend within the casing near the bottom thereof below the shelf or rack 8, whereby to provide a readily renewable combined heating and lighting unit, whereby to supply heat for heating and warming the cones or other articles placed in the oven on the shelf 8.

The cones are preferably stacked on the shelf or rack 8, with their large ends downwardly, and in order to maintain the stacks of cones in place, and provide for the illumination thereof, the shelf or plate 8 has suitably arranged openings 12, over which the lower cones are seated, so that the light passing upwardly through the openings, will light up the cones from the interior, and the shelf 8 preferably has annular upturned lips 13 surrounding the openings 12 over which the mouths of the lower cones are fitted, to prevent the stacks from sliding out of position and to retain the stacks in predetermined positions spaced from one another for the effective illumination and display of the cones and for the uniform upward flow of air around the stacks. The shelf 8 can also have openings 14 between the stacks of cones for the passage of light upwardly through the shelf to illuminate the cones on the exterior. The light rays which pass upwardly through the openings 12 will illuminate the cones from the interior, which if the cones are semi-transparent as frequently is the case, and such cones being nested or fitted one on the other, will gradually diminish the illumination from the interior from the lower cone upward, which will give a pleasing effect. Furthermore, the heated air which passes upwardly through the openings 12 will pass upwardly through the cones, to effectively dry the cones.

The cones or other articles are readily accessible by opening the cover or top 7 of the casing, and will be kept warm in the oven, to dry out the cones or articles and render them crisp and warm, so as to be more enjoyable and digestible.

The oven is also used for display or advertising purposes. Thus, one wall, preferably the front wall of the casing, has a window or opening 15 above the horizontal plane of the shelf 8, across which a display panel 16 of glass or other transparent material is disposed, being supported in any suitable manner, and having a suitable sign or advertising matter printed or otherwise provided thereon. This panel will therefore serve as advertisement to enhance the sale of the goods, being illuminated from within the casing, the interior surface of which is polished so as to reflect the rays, and, at the same time, the panel is transparent, so that cones can be seen and will be displayed to good advantage. The panel is lighted by the light passing between and through the cones from the openings 12 and 14, and, it is preferable to space the forward edge of the shelf from the front wall of the casing and lower edge of the panel, to leave a space or opening 17 through which the light rays can be reflected from the bottom of the casing up against the inner surface of the panel, to assist in the illumination thereof.

The present appliance is intended particularly for purpose of heating and warming ice cream cones, or similar articles, to render them crisp and palatable, as well as simultaneously advertising them to increase sales, although the oven can be used for other purposes for which it is suited.

Having thus described the invention, what is claimed as new is:—

1. A combined oven and display device comprising a casing, a source of heat and light within the casing, and means within the casing above said source of heat and light constructed and arranged for supporting stacks of ice cream cones or other cup pastry and having portions over which the open ends of the lowermost cones or cups are adapted to be placed for retaining the stacks in position and to receive the heat and light rays from below.

2. A combined oven and display device comprising a casing, a source of heat and light within the casing, and a shelf in the casing above said source of heat and light for supporting stacks of ice cream cones or other cup pastry, said shelf being formed with portions over which the open ends of the lowermost cones or cups can be placed for retaining the stacks in position and to receive the heat and light rays from below said shelf.

3. A combined oven and display device comprising a casing, a source of heat and light in the casing, a shelf in the casing above said source of heat and light having openings and upturned lips surrounding said openings over which the open ends of ice cream cones or other cup pastry can be placed for holding the cones or pastry in position and to receive the heat and light rays from said source, said shelf having other openings for the upward passage of heat and light rays between the cones or pastry, and the casing having a transparent portion above said shelf for exposing said cones or pastry for observation.

4. An oven comprising a casing, a shelf therein having openings and upturned lips surrounding said openings over which the open ends of ice cream cones or similar articles can be placed, and an electric lamp in the casing under said shelf for heating said cones or similar articles, and directing light upwardly through said openings.

5. A combined oven and display device comprising a casing, a shelf in the casing for supporting ice cream cones or other articles, an electric lamp in the casing under said shelf for heating said cones or other articles above the shelf, an advertising panel carried by one wall of the casing, said shelf and panel being spaced apart for the passage of light rays through such spaces from the lamp to said panel.

6. A combined oven and display device comprising a casing, a shelf in the casing for supporting ice cream cones or other articles, an electric lamp in the casing under said shelf for heating said cones or other articles, and a transparent display and advertising panel carried by one wall of the casing above the plane of said shelf and displaying said cones or other articles for observation, said shelf having openings for the upward passage of light to illuminate said cones or other articles, and said shelf being spaced from said wall for the passage of light rays upwardly from under said shelf to said panel.

7. A combined oven and display device comprising a casing, a source of heat and light within the casing, a shelf in the casing over said source of heat and light for supporting articles to be heated and illuminated from said source, the casing having an advertising panel at one side disposed above the plane of said shelf, said shelf and panel being spaced apart for the upward passage of light through such space to the panel, and the inner surfaces of the casing being polished for reflecting the light to the articles and panel.

8. A casing having a transparent portion, a source of light, and means for supporting and holding cup pastry in the container in a predetermined spaced relation against transverse displacement with the open ends thereof directed toward said source of light for the passage of illuminating rays into the pastry.

9. A casing having a transparent portion, a source of heat and light rays in the casing, and means within the casing for supporting and holding cup pastry in a predetermined spaced relation against transverse displacement with the open ends thereof directed toward said source of heat and light for the passage of the heat and light rays into the interior of the pastry from said source.

10. A casing having a transparent portion, a source of heat rays within the casing, and means for supporting stacks of cup pastry within the casing and having portions over which the open ends of the pastry can be placed to be held in a predetermined spaced relation against transverse displacement and to be directed toward said source of heat for the passage of heat rays into the interior of the pastry.

11. A casing having a transparent portion, a source of heat and light rays within the casing, and means for supporting stacks of nested cup pastry in the casing, said means having open portions over which the open ends of the pastry can be placed to be held in a predetermined spaced relation against transverse displacement and to be directed toward said source of heat and light rays for the passage of heat and light rays into the interior of the pastry, said means also having openings for the passage of heat and light rays to the exterior of the pastry.

12. In a display device, a source of light rays, and means for supporting cup pastry and for receiving and holding the open ends thereof in a predetermined spaced relation against transverse displacement with such open ends directed toward said source of light rays for the passage of the light rays into the interior of the pastry.

13. In a display device, a source of heat and light rays, and means for supporting cup pastry and for receiving and holding the open ends thereof in a predetermined spaced relation against transverse displacement with such ends directed toward said source of heat and light rays for the passage of the heat and light rays into the pastry to illuminate and warm the pastry from within.

14. A combined oven and display device comprising a casing, a source of heat and light within the casing, and means within the casing near said source of heat and light constructed and arranged for supporting stacks of ice cream cones or other cup pastry and having portions for engaging and fitting the lowermost cones of the stacks for supporting and retaining the stacks in vertical position in a predetermined spaced relation against horizontal displacement said casing having a transparent portion exposing the cones or cups for observation.

15. A combined oven and display device comprising a casing, a source of heat and light within the casing, and a shelf within the casing above said source of heat and light having portions constructed and arranged for supporting vertical stacks of ice cream cones or other cup pastry, said portions engaging and fitting the lowermost cones or cups of the stacks for supporting and maintaining the stacks in vertical position in a predetermined spaced relation against horizontal displacement, said casing having a transparent portion exposing the cones or cups for observation.

16. A combined oven and display device comprising a casing, a source of heat and light within the casing, and means within the casing near said source of heat and light constructed and arranged for supporting vertical stacks of ice cream cones or other cup pastry and having portions to fit and engage the larger open ends of the lowermost cones or cups for supporting and retaining the stacks in vertical position in the casing in a predetermined spaced relation against horizontal displacement, said casing having a transparent portion exposing the cones or cups for observation.

17. A combined oven and display device comprising a casing having a window or transparent portion for displaying the contents, a source of heat and light within the casing, and means for holding and supporting stacks of ice cream cones or other cup pastry within the casing and constructed and arranged for supporting said stacks in spaced predetermined positions against horizontal displacement for the effective illumination and display of the cones or pastry and for the upward flow of air around the cones.

18. A combined oven and display device comprising a casing having a window or transparent portion for displaying the contents, a source of heat and light within the casing, and a shelf within the casing for supporting stacks of nested ice cream cones or other cup pastry, said shelf being constructed and arranged for retaining such stacks in predetermined positions spaced from one another against horizontal displacement for the effective illumination and display of the cones or pastry and for the upward flow of air around the stacks.

In testimony whereof I have signed my name to this specification.

CHARLES GAINER TURNER.